United States Patent [19]

Field et al.

[11] Patent Number: 4,653,528

[45] Date of Patent: Mar. 31, 1987

[54] MULTI-ADAPTIVE FUEL PRESSURE REGULATOR

[75] Inventors: Martin J. Field, Churchville; Andrew J. Makusij, Fairport; James L. Penwright, Gasport, all of N.Y.

[73] Assignee: General Motors Corporation, Detroit, Mich.

[21] Appl. No.: 891,353

[22] Filed: Jul. 28, 1986

Related U.S. Application Data

[63] Continuation-in-part of Ser. No. 830,281, Feb. 18, 1986.

[51] Int. Cl.$^4$ .............................................. F16K 31/12
[52] U.S. Cl. .................................. 137/269; 137/510; 123/468; 123/511; 251/366
[58] Field of Search ................ 137/269, 510; 123/463, 123/468, 510, 511, 512, 514; 251/366

[56] References Cited

U.S. PATENT DOCUMENTS 4,046,350  9/1977  Massey .......................... 137/269 X
4,570,600  2/1986  Atkins ............................... 123/468

Primary Examiner—Harold W. Weakley
Attorney, Agent, or Firm—C. K. Veenstra

[57] ABSTRACT

A fuel pressure regulator has a multi-faceted extruded base that allows the outlet from the pressure regulator to be oriented in any of six different directions. A fuel body has a projecting snout and a fuel passage extending through the snout, and the inlet to the pressure regulator plugs directly onto the snout; the fuel passage thereby supplies fuel to the pressure regulator, and the pressure regulator thereby maintains the desired fuel pressure in the passage.

12 Claims, 18 Drawing Figures

MULTI-ADAPTIVE FUEL PRESSURE REGULATOR

This is a continuation-in-part of application Ser. No. 830,281 filed Feb. 18, 1986.

TECHNICAL FIELD

This invention relates to a fuel pressure regulator for an engine fuel system.

BACKGROUND

Fuel injection systems for automotive engines generally include a fuel pressure regulator to maintain the fuel at a pressure appropriate for delivery to the engine. In each system the design of the fuel pressure regulator must be suitable for its particular application, and often a new fuel pressure regulator design must be developed for a new fuel injection system application.

SUMMARY OF THE INVENTION

This invention provides a fuel pressure regulator adapted for a multiplicity of fuel injection system applications.

In one embodiment of a fuel pressure regulator according to one aspect of this invention, the pressure regulator base is formed from a symetrical extrusion having three sides provided with projections that define five planar regions. The five planar regions defined by the projections, together with a sixth planar region defined by an end of the base, are each adapted to accept a cutting tool for forming an outlet from the fuel pressure regulator, whereby the fuel pressure regulator may be equipped with an outlet oriented in any of six directions.

In another embodiment of a fuel pressure regulator according to one aspect of this invention, the pressure regulator base is formed from an asymetric extrusion having sides that define three planar regions. The three planar regions, together with a planar region defined by an end of the base, are each adapted to accept a cutting tool for forming an outlet from the fuel pressure regulator. By locating the inlet at either of the two ends of the base, the fuel pressure regulator may be equipped with an outlet oriented in any of six directions.

In a fuel pressure regulator according to another aspect of this invention, the fuel pressure regulator is plugged directly onto a snout extending from a fuel body and receives fuel from a fuel passage extending through the snout to maintain the desired fuel pressure in the passage. The fuel pressure regulator thereby forms a secure and compact assembly with the fuel body.

The details as well as other features and advantages of two embodiments of this invention are set forth in the remainder of the specification and are shown in the accompanying drawings.

THE PREFERRED EMBODIMENTS

Figure 1:
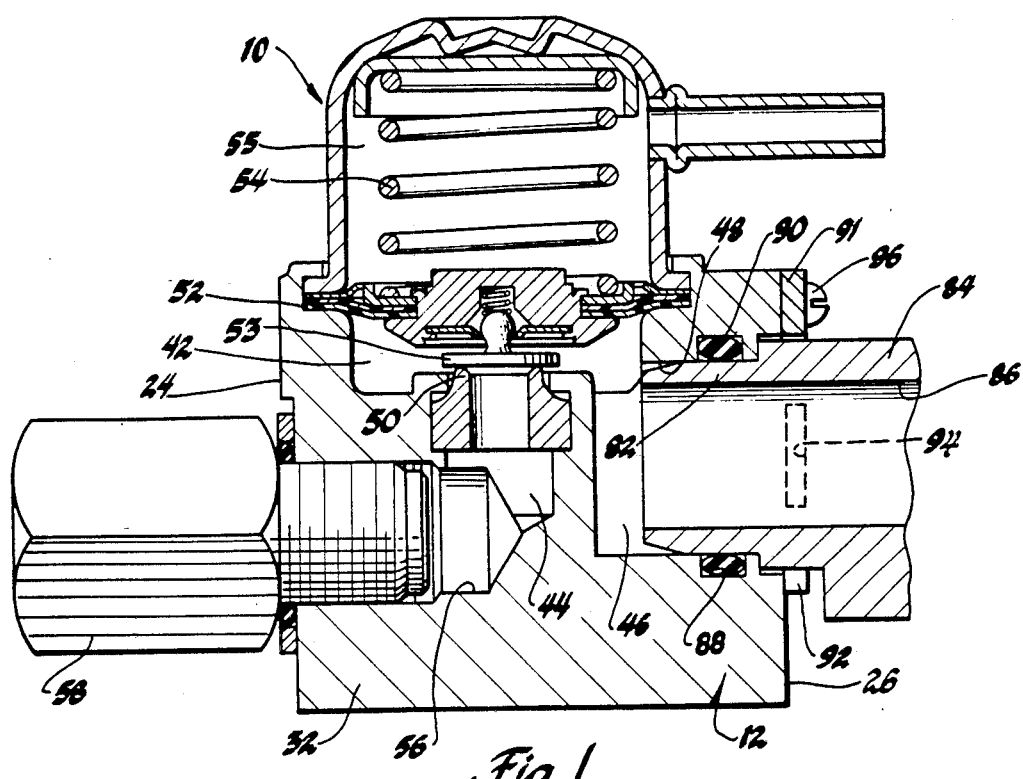
FIG. 1 is a sectional view of one embodiment of a fuel pressure regulator according to this invention, showing the fuel pressure regulator plugged directly onto a snout projecting from a fuel body.
Figure 2:
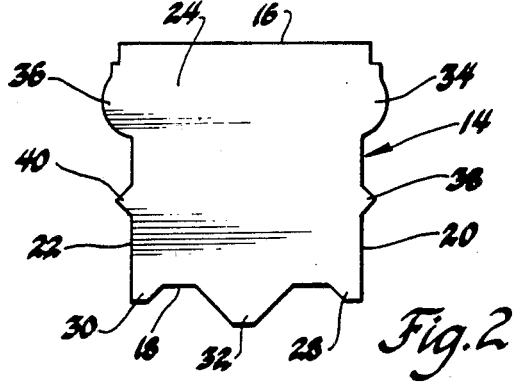
FIG. 2 is an end view of an extrusion from which the FIG. 1 fuel pressure regulator was formed.
Figure 3:
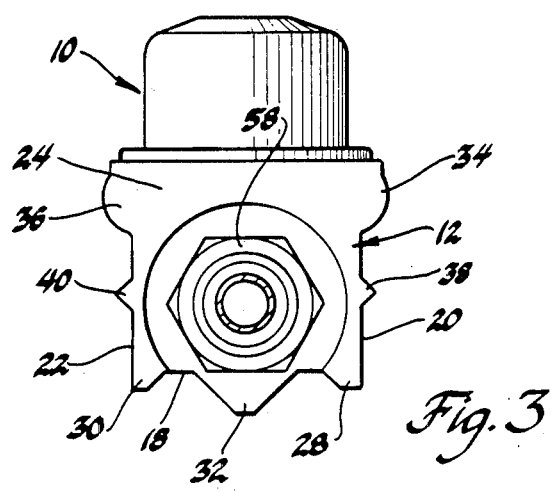
FIG. 3 is an end view of the FIG. 1 fuel pressure regulator, showing the fuel outlet oriented in one of the six possible directions.

Referring first to FIGS. 1–3, a fuel pressure regulator 10 has a six-sided base 12 formed from the aluminum extrusion 14 shown in FIG. 2. As viewed in FIG. 2, extrusion 14 has a top surface 16, a bottom surface 18 and lateral surfaces 20 and 22 formed during extrusion. Those four surfaces, together with the cut-off ends 24 and 26 of extrusion 14, define the six sides of base 12.

The end 24 of extrusion 14 forms a first planar region which is viewed in elevation in FIG. 2.

The bottom surface 18 of extrusion 14 has a pair of depending legs 28 and 30. Between legs 28 and 30, surface 18 forms a second planar region facing downwardly as viewed in FIG. 2. Surface 18 has a projection 32 that is trapezoidal in cross-section.

The lateral surfaces 20 and 22 of extrusion 14 have enlargements 34 and 36. Below enlargements 34 and 36, surface 20 forms a third planar region facing rightwardly as viewed in FIG. 2, and surface 22 forms a fourth planar region facing leftwardly as viewed in FIG. 2. Surface 20 has a projection 38 and surface 22 has a projection 40, projections 38 and 40 being triangular in cross-section.

Projections 32 and 38 form a fifth planar region facing downwardly and to the right as viewed in FIG. 2, and projections 32 and 40 form a sixth planar region facing downwardly and to the left as viewed in FIG. 2.

From the upper surface 16, extrusion 14 is machined to form a regulated fuel pressure chamber 42 and a small excess fuel chamber 44. Chamber 42 has a well 46 that receives fuel from an inlet 48 machined through the cut-off end 26 of extrusion 14. A valve seat 50 is inserted between chambers 42 and 44. A diaphragm 52 closes regulated fuel pressure chamber 42 and carries a valve member 53. Diaphragm 52 positions valve member 53 to control fuel flow from regulated fuel pressure chamber 42 through valve seat 50 to excess fuel chamber 44, balancing the fuel pressure in regulated fuel pressure chamber 42 on diaphragm 52 with the force of a spring 54 and with the pressure in the bias chamber 55 above diaphragm 52. Pressure regulator 10 thereby maintains the desired fuel pressure in regulated fuel pressure chamber 42 and discharges excess fuel to excess fuel chamber 44. Diaphragm 52 is supported and retained as set forth in copending application Ser. No. 821,031 filed Jan. 21, 1986 in the name of M. J. Field.

In the embodiment of FIGS. 1 and 3, the planar region formed by cut-off end 24 accepts a cutting tool that machines an outlet 56 opening from excess fuel chamber 44 to discharge excess fuel therefrom. A fuel discharge fitting 58 threaded into outlet 56 accordingly is oriented parallel to fuel inlet 48.

Figure 4:
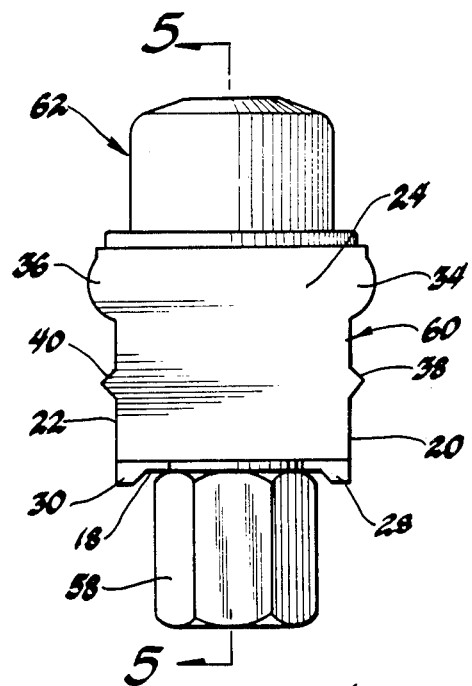
FIG. 4 is an end view of a fuel pressure regulator also formed from the FIG. 2 extrusion, showing the fuel outlet oriented in a second direction.
Figure 5:
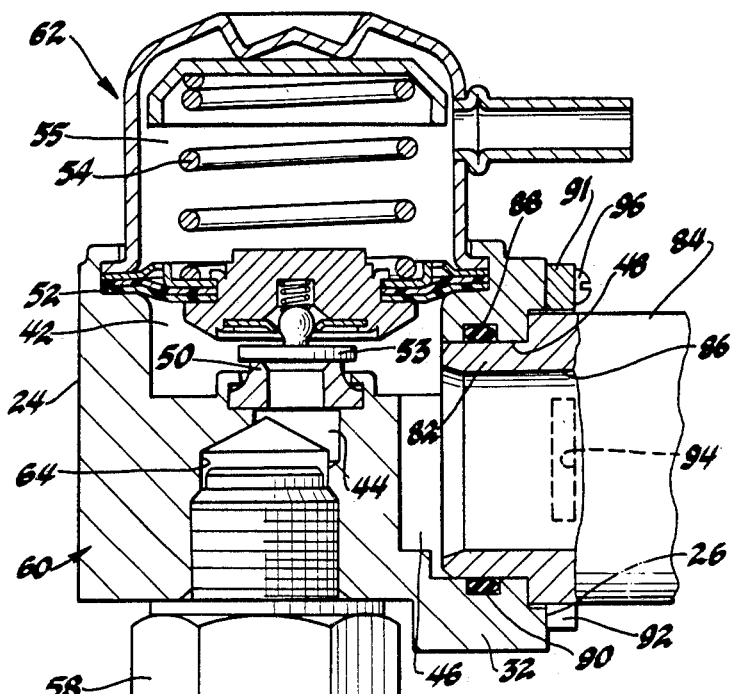
FIG. 5 is a sectional view of the FIG. 4 fuel pressure regulator, taken along line 5—5 of FIG. 4, also showing the fuel pressure regulator plugged directly onto a snout projecting from a fuel body.

The base 60 of the fuel pressure regulator 62 shown in FIGS. 4 and 5 is similar to the base 12 of fuel pressure regulator 10. In the embodiment of FIGS. 4 and 5, however, the planar region formed by bottom surface 18 accepts a cutting tool that machines an outlet 64 opening from excess fuel chamber 44, removing a portion of projection 32 in the process. When threaded into outlet 64, fuel discharge fitting 58 accordingly is oriented perpendicular to fuel inlet 48 and directed downwardly as viewed in FIGS. 4 and 5. Fuel pressure regulator 62 is otherwise similar to fuel pressure regulator 10.

Figure 6:
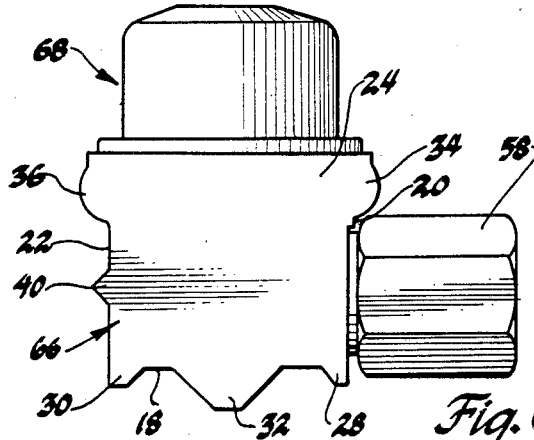
FIG. 6 is an end view of a fuel pressure regulator also formed from the FIG. 2 extrusion, showing the fuel outlet oriented in a third direction.

In the base 66 of the fuel pressure regulator 68 shown in FIG. 6, the planar region formed by lateral surface 20 accepts a cutting tool that machines an outlet opening from the excess fuel chamber, removing a portion of projection 38 in the process. Accordingly, when fuel discharge fitting 58 is threaded into the outlet, it is oriented perpendicular to the fuel inlet and is directed rightwardly as viewed in FIG. 6. Fuel pressure regulator 68 is otherwise similar to fuel pressure regulators 10 and 62.

Figure 7:
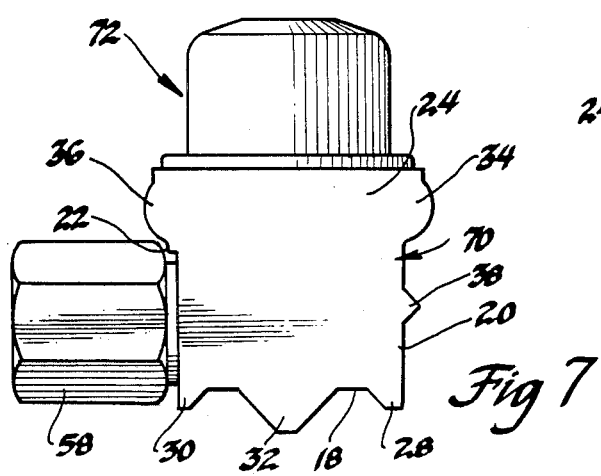
FIG. 7 is an end view of a fuel pressure regulator also formed from the FIG. 2 extrusion, showing the fuel outlet oriented in a fourth direction.

In the base 70 of the fuel pressure regulator 72 shown in FIG. 7, the planar region formed by lateral surface 22 accepts a cutting tool that machines an outlet opening from the excess fuel chamber, removing a portion of projection 40 in the process. Accordingly, when fuel discharge fitting 58 is threaded into the outlet, it is oriented perpendicular to the fuel inlet and is directed leftwardly as viewed in FIG. 7. Fuel pressure regulator 72 is otherwise similar to fuel pressure regulators 10, 62 and 68.

Figure 8:
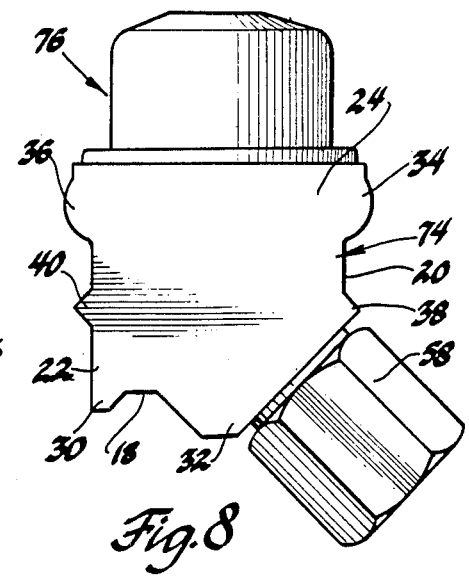
FIG. 8 is an end view of a fuel pressure regulator also formed from the FIG. 2 extrusion, showing the fuel outlet oriented in a fifth direction.

In the base 74 of the fuel pressure regulator 76 shown in FIG. 8, the planar region defined by projections 32 and 38 accepts a cutting tool that machines an outlet opening from the excess fuel chamber, removing a portion of leg 28 in the process. Accordingly, when fuel discharge fitting 58 is threaded into the outlet, it is oriented perpendicular to the fuel inlet and is directed downwardly and leftwardly as viewed in FIG. 8. Fuel pressure regulator 76 is otherwise similar to fuel pressure regulators 10, 62, 68 and 72.

Figure 9:
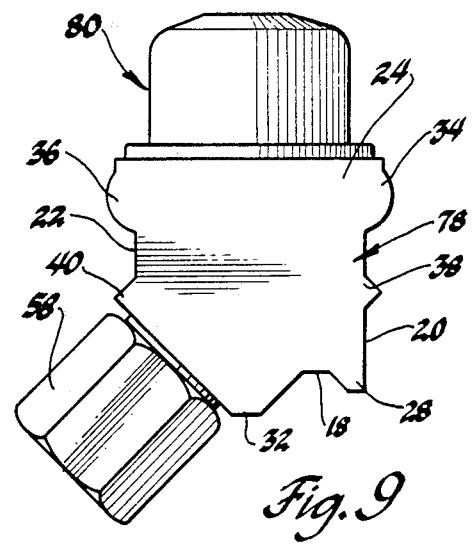
FIG. 9 is an end view of a fuel pressure regulator also formed from the FIG. 2 extrusion, showing the fuel outlet oriented in a sixth direction.

In the base 78 of the fuel pressure regulator 80 shown in FIG. 9, the planar region defined by projections 32 and 40 accepts a cutting tool that machines an outlet opening from the excess fuel chamber, removing a portion of leg 30 in the process. Accordingly, when fuel discharge fitting 58 is threaded into the outlet, it is oriented perpendicular to the fuel inlet and is directed downwardly and leftwardly as viewed in FIG. 9. Fuel pressure regulator 80 is otherwise similar to fuel pressure regulators 10, 62, 68, 72 and 76.

As shown in FIGS. 1 and 5, the inlet 48 of each fuel pressure regulator is plugged directly onto a snout 82 formed on a fuel body 84. A fuel passage 86 extends from fuel body 84 through snout 82 to supply fuel to the regulated fuel pressure chamber 42, and the fuel pressure regulator maintains the desired fuel pressure in fuel passage 86.

Inlet 48 has an enlarged portion 88 containing an O-ring 90 that seals the connection between the pressure regulator base and fuel body 84. A bracket 91 has legs 92 that straddle fuel body 84 and are secured in grooves 94 formed on the outside of fuel body 84. Screws 96 are received in enlargements 34 and 36 of extrusion 14 to secure bracket 91 to the fuel pressure regulator. The fuel pressure regulator accordingly forms a secure and compact assembly with fuel body 84.

Figure 10:
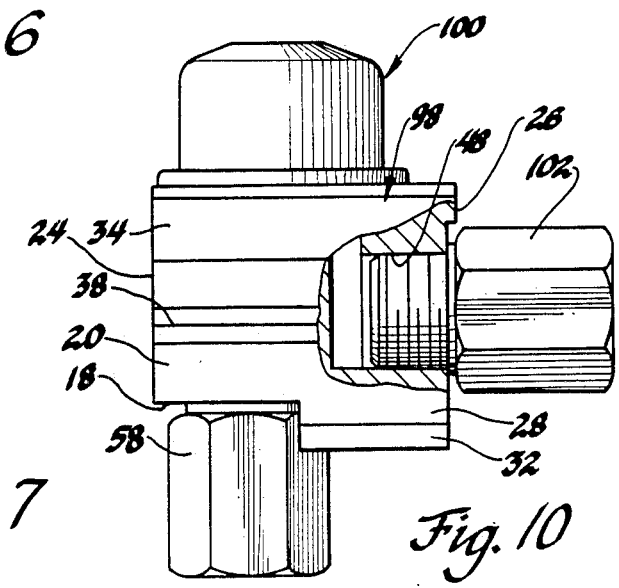
FIG. 10 is a side view of a fuel pressure regulator also formed from the FIG. 2 extrusion, with parts broken away to show a separate inlet fitting.

The base 98 of the fuel pressure regulator 100 shown in FIG. 10 has a fuel inlet fitting 102 threaded into inlet 48 to allow use of fuel pressure regulator 100 in an application where it cannot be plugged directly onto a fuel body. Fuel pressure regulator is otherwise similar to fuel pressure regulators 10, 62, 68, 72, 76 and 80.

Figure 11:
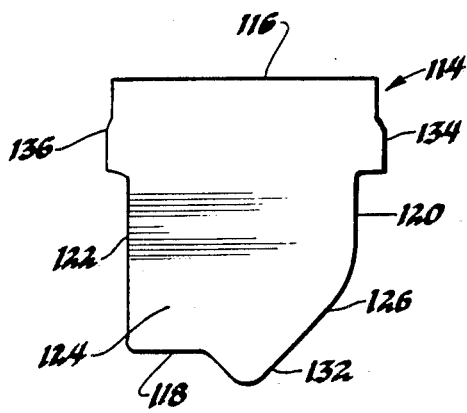
FIG. 11 is an end view of an extrusion from which another embodiment of a fuel pressure regulator is formed according to this invention.
Figure 12:
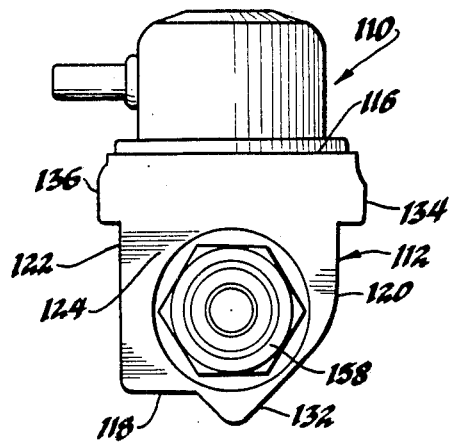
FIG. 12 is an end view of a fuel pressure regulator formed from the FIG. 11 extrusion, showing the fuel outlet oriented in one of the six possible directions.

Referring next to FIGS. 11–12, a fuel pressure regulator 110 has a six-sided base 112 formed from the aluminum extrusion 114 shown in FIG. 11. As viewed in FIG. 11, extrusion 114 has a top surface 116, a bottom surface 118 and lateral surfaces 120 and 122 formed during extrusion. Those four surfaces, together with the cut-off ends 124 and 126 of extrusion 114, define the six sides of base 112.

The end 124 of extrusion 114 forms a first planar region which is viewed in elevation in FIG. 11. The opposite end 126 is hidden in FIG. 11.

The bottom surface 118 of extrusion 114 forms a second planar region facing downwardly as viewed in FIG. 11. Surface 118 has a projection 132 that is trapezoidal in cross-section.

The lateral surfaces 120 and 122 of extrusion 114 have enlargements 134 and 136. Below enlargements 134 and 136, surface 120 forms a curved region facing rightwardly and downwardly as viewed in FIG. 11, and surface 122 forms a third planar region facing leftwardly as viewed in FIG. 11.

Projection 132 forms a fourth planar region facing downwardly and to the left as viewed in FIG. 11.

Extrusion 114 is machined in the same manner as extrusion 14 to form the base 112 of fuel pressure regulator 110, and fuel pressure regulator 110 is otherwise constructed and assembled in a manner similar to fuel pressure regulator 10.

In the embodiment of FIG. 12, the fuel inlet is machined in the hidden end face 126 of extrusion 114, and the planar region formed by cut-off end 124 accepts a cutting tool that machines an outlet opening from the excess fuel chamber. Accordingly, when a fuel discharge fitting 158 is threaded into the outlet, it is oriented parallel to the fuel inlet.

Figure 13:
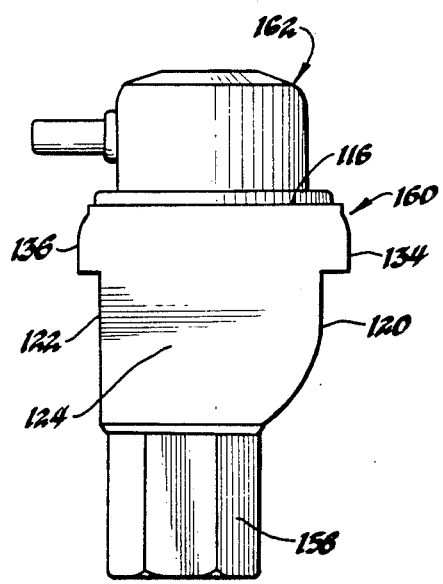
FIG. 13 is an end view of a fuel pressure regulator also formed from the FIG. 11 extrusion, showing the fuel outlet oriented in a second direction.

The base 160 of the fuel pressure regulator 162 shown in FIG. 13 is similar to the base 112 of fuel pressure regulator 110. In the embodiment of FIG. 13, however, the planar region formed by bottom surface 118 accepts a cutting tool that machines an outlet opening from the excess fuel chamber, removing projection 132 in the process. When threaded into the outlet, fuel discharge fitting 158 accordingly is oriented perpendicular to the fuel inlet on the hidden end 126 of extrusion 114, and is directed downwardly as viewed in FIG. 13. Fuel pressure regulator 162 is otherwise similar to fuel pressure regulator 110.

Figure 14:
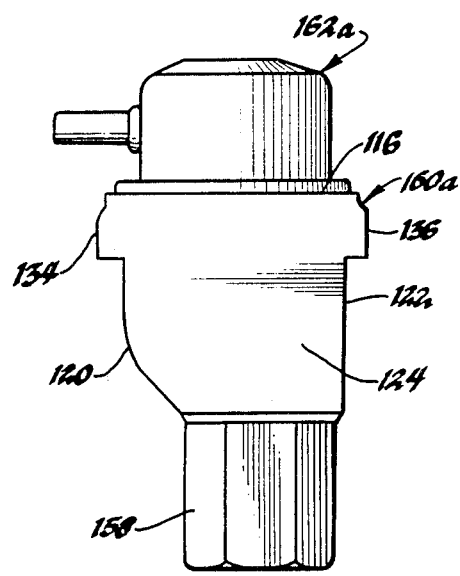
FIG. 14 is an end view of another fuel pressure regulator also formed from the FIG. 11 extrusion, showing the fuel outlet oriented in the second direction but offset on the opposite side of the center line from the FIG. 13 fuel pressure regulator.

The base 160a of the fuel pressure regulator 162a shown in FIG. 14 is similar to the base 160 of fuel pressure regulator 162. In the embodiment of FIG. 14, however, the fuel inlet is machined in the end face 124 of extrusion 114, hidden from view in FIG. 14. The planar region formed by bottom surface 118 accepts a cutting tool that machines an outlet opening from the excess fuel chamber, removing projection 132 in the process. When threaded into the outlet, fuel discharge fitting 158 is oriented perpendicular to the fuel inlet and directed downwardly as viewed in FIG. 14. Comparison of FIGS. 13 and 14 will show that fuel outlet fitting 158 is offset to the left of center in FIG. 13 and to the right of center in FIG. 14. Fuel pressure regulator 162a is otherwise similar to fuel pressure regulator 110 and 162.

Figure 15:
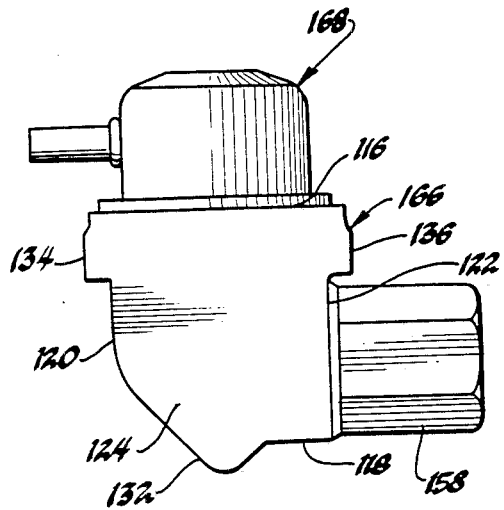
FIG. 15 is an end view of a fuel pressure regulator also formed from the FIG. 11 extrusion, showing the fuel outlet oriented in a third direction.

In the base 166 of the fuel pressure regulator 168 shown in FIG. 15, the fuel inlet is machined in the hidden end face 124 of extrusion 114, and the planar region formed by lateral surface 122 accepts a cutting tool that machines an outlet opening from the excess fuel chamber. Accordingly, when fuel discharge fitting 158 is threaded into the outlet, it is oriented perpendicular to the fuel inlet and is directed rightwardly as viewed in FIG. 15. Fuel pressure regulator 168 is otherwise similar to fuel pressure regulators 110, 162 and 162a.

Figure 16:
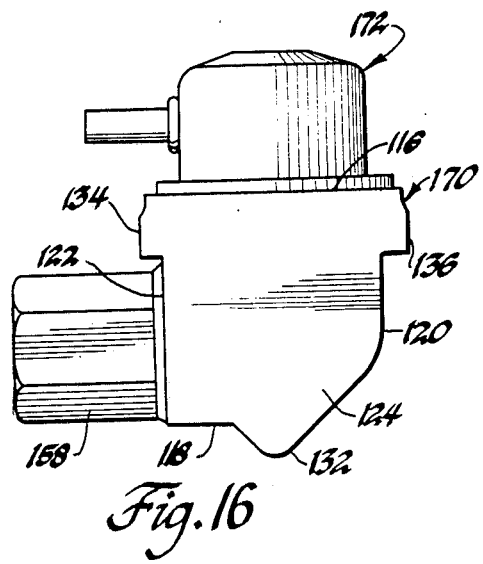
FIG. 16 is an end view of a fuel pressure regulator also formed from the FIG. 11 extrusion, showing the fuel outlet oriented in a fourth direction.

In the base 170 of the fuel pressure regulator 172 shown in FIG. 16, the fuel inlet is machined in the hidden end face 126 of extrusion 114, and the planar region formed by lateral surface 122 accepts a cutting tool that machines an outlet opening from the excess fuel chamber. Accordingly, when fuel discharge fitting 158 is threaded into the outlet, it is oriented perpendicular to the fuel inlet and is directed leftwardly as viewed in FIG. 16. Fuel pressure regulator 172 is otherwise similar to fuel pressure regulators 110, 162, 162a and 168.

Figure 17:
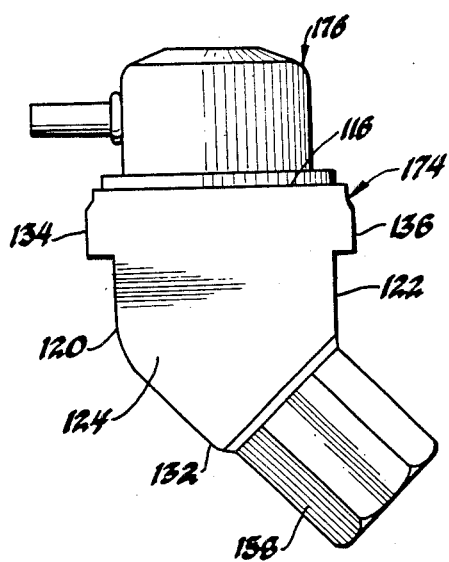
FIG. 17 is an end view of a fuel pressure regulator also formed from the FIG. 11 extrusion, showing the fuel outlet oriented in a fifth direction.

In the base 174 of the fuel pressure regulator 176 shown in FIG. 17, the fuel inlet is machined in the hidden end face 124 of extrusion 114, and the planar region defined by projection 132 accepts a cutting tool that machines an outlet opening from the excess fuel chamber. Accordingly, when fuel discharge fitting 158 is threaded into the outlet, it is oriented perpendicular to the fuel inlet and is directed downwardly and rightwardly as viewed in FIG. 17. Fuel pressure regulator 176 is otherwise similar to fuel pressure regulators 110, 162, 162a, 168 and 172.

Figure 18:
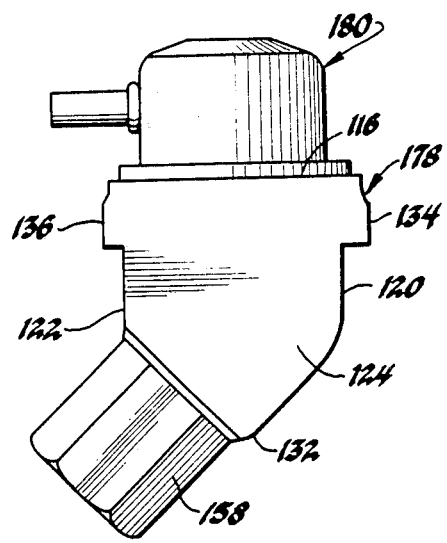
FIG. 18 is an end view of a fuel pressure regulator also formed from the FIG. 11 extrusion, showing the fuel outlet oriented in a sixth direction.

In the base 178 of the fuel pressure regulator 180 shown in FIG. 18, the fuel inlet is machined in the hidden end face 126 of extrusion 114, and the planar region defined by projection 132 accepts a cutting tool that machines an outlet opening from the excess fuel chamber. Accordingly, when fuel discharge fitting 158 is threaded into the outlet, it is oriented perpendicular to the fuel inlet and is directed downwardly and leftwardly as viewed in FIG. 18. Fuel pressure regulator 180 is otherwise similar to fuel pressure regulators 110, 162, 162a, 168, 172 and 176.

The embodiments of the invention in which an exclusive property or privilege is claimed are defined as follows:

1. A fuel pressure regulator base formed from an extrusion and having a regulated fuel pressure chamber and an excess fuel chamber, said base being substantially six-sided and one side of said base having an inlet opening to said regulated fuel pressure chamber to supply fuel thereto, said regulated fuel pressure chamber opening through a second side of said base adjacent said one side, said base being adapted to support a diaphragm carrying a valve member for controlling fuel flow from said regulated fuel pressure chamber to said excess fuel chamber, wherein the remaining three sides of said base adjacent said one side have at least one projection and define a plurality of planar regions and the side of said base opposite said one side defines an additional planar region, and wherein each of said planar regions is adapted to accept a cutting tool for forming an outlet opening from said excess fuel chamber to discharge fuel therefrom, whereby said fuel pressure regulator may be equipped with an outlet oriented in any of six directions with respect to said inlet.

2. A fuel pressure regulator base formed from an extrusion and having a regulated fuel pressure chamber and an excess fuel chamber, said base being substantially six-sided and one side of said base having an inlet opening to said regulated fuel pressure chamber to supply fuel thereto, said regulated fuel pressure chamber opening through a second side of said base adjacent said one side, said base being adapted to support a diaphragm carrying a valve member for controlling fuel flow from said regulated fuel pressure chamber to said excess fuel chamber, wherein the remaining three sides of said base adjacent said one side have projections defining five planar regions and the side of said base opposite said one side defines a sixth planar region, and wherein each of said planar regions is adapted to accept a cutting tool for forming an outlet opening from said excess fuel chamber to discharge fuel therefrom, whereby said fuel pressure regulator may be equipped with an outlet oriented in any of six directions with respect to said inlet.

3. A fuel pressure regulator base formed from an extrusion and having a regulated fuel pressure chamber and an excess fuel chamber, said base being substantially six-sided and one side of said base having an inlet opening to said regulated fuel pressure chamber to supply fuel thereto, said regulated fuel pressure chamber opening through a second side of said base, said base being adapted to support a diaphragm carrying a valve member for controlling fuel flow from said regulated fuel pressure chamber to said excess fuel chamber, wherein the remaining four sides of said base define planar regions each adapted to accept a cutting tool for forming an outlet opening from said excess fuel chamber to discharge fuel therefrom, four of said planar regions being formed by said remaining four sides, the third and the fourth sides of said base having projections forming a fifth of said planar regions, and the third and the fifth sides of said base having projections forming the sixth of said planar regions, whereby said fuel pressure regulator may be equipped with an outlet oriented in any of six directions with respect to said inlet.

4. A fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one side of said base having an inlet opening to said regulated fuel pressure chamber to supply fuel thereto, said regulated fuel pressure chamber opening through a second side of said base adjacent said one side, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, wherein the remaining three sides of said base adjacent said one side have projections defining five planar regions and the side of said base opposite said one side defines a sixth planar region, said six planar regions being oriented in six different directions with respect to said inlet, and wherein an outlet is formed through one of said planar regions, said outlet opening from said excess fuel chamber to discharge fuel therefrom.

5. A fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one side of said base having an inlet opening to said regulated fuel pressure chamber to supply fuel thereto, said regulated fuel pressure chamber opening through a second side of said base, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, and wherein the remaining four sides of said base define six planar regions, four of said planar regions being formed by said remaining four sides, the third and the fourth sides of said base having projections forming a fifth of said planar regions, and the third and the fifth sides of said base having projections forming the sixth of said planar regions, said six planar regions being oriented in six different directions with respect to said inlet, each of said planar regions being adapted to accept a cutting tool for forming an outlet, and wherein an outlet is formed through one of said planar regions, said outlet opening from said excess fuel chamber to discharge fuel therefrom.

6. An assembly of a fuel pressure regulator and a fuel body, said fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one side of said base having an inlet opening to said regulated fuel pressure chamber to supply fuel thereto, said regulated fuel pressure chamber opening through a second side of said base, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, wherein the remaining four sides of said base define six planar regions, four of said planar regions being formed by said remaining four sides, the third and the fourth sides of said base having projections forming a fifth of said planar regions, and the third and the fifth sides of said base having projections forming the sixth of said planar regions, said six planar regions being oriented in six different directions with respect to said inlet, each of said planar regions being adapted to accept a cutting tool for forming an outlet, wherein an outlet is formed through one of said planar regions, said outlet opening from said excess fuel chamber to discharge fuel therefrom, wherein said fuel body has a snout projecting therefrom and a fuel passage extending through said snout, and wherein said fuel pressure regulator inlet is plugged directly onto said snout whereby said fuel passage supplies fuel to said regulated fuel pressure chamber and said fuel pressure regulator maintains the desired fuel pressure in said fuel passage.

7. An assembly of a fuel pressure regulator and a fuel body, said fuel pressure regulator comprising a base having a regulated fuel pressure chamber and an excess fuel chamber, a valve seat separating said regulated fuel pressure chamber from said excess fuel chamber, one side of said base having an inlet opening to said regulated fuel pressure chamber to supply fuel thereto, said regulated fuel pressure chamber opening through a second side of said base, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, wherein said fuel body has a snout projecting therefrom and a fuel passage extending through said snout, and wherein said fuel pressure regulator inlet is plugged directly onto said snout whereby said fuel passage supplies fuel to said regulated fuel pressure chamber and said fuel pressure regulator maintains the desired fuel pressure in said fuel passage.

8. A fuel pressure regulator base formed from an extrusion and having a regulated fuel pressure chamber and an excess fuel chamber, said base being substantially six-sided and one of two opposite sides of said base having an inlet opening to said regulated fuel pressure chamber to supply fuel thereto, said regulated fuel pressure chamber opening through a third side of said base adjacent said one side, said base being adapted to support a diaphragm carrying a valve member for controlling fuel flow from said regulated fuel pressure chamber to said excess fuel chamber, wherein a fourth side of said base opposite said third side has a projection which, with said fourth side and a fifth side, defines three planar regions and the other of said opposite sides defines a fourth planar region, and wherein each of said planar regions is adapted to accept a cutting tool for forming an outlet opening from said excess fuel chamber to discharge fuel therefrom, whereby said fuel pressure regulator may be equipped with an outlet oriented in any of six directions with respect to said inlet.

9. A fuel pressure regulator base formed from an extrusion and having a regulated fuel pressure chamber and an excess fuel chamber, said base being substantially six-sided and one of two opposite sides of said base having an inlet opening to said regulated fuel pressure chamber to supply fuel thereto, said regulated fuel pressure chamber opening through a third side of said base, said base being adapted to support a diaphragm carrying a valve member for controlling fuel flow from said regulated fuel pressure chamber to said excess fuel chamber, wherein two of the remaining sides and the other of said opposite sides of said base define planar regions each adapted to accept a cutting tool for forming an outlet opening from said excess fuel chamber to discharge fuel therefrom, three of said planar regions being formed by said two remaining sides, and said other of said opposite sides, and one of said two remaining sides of said base having a projection forming a fourth of said planar regions, whereby said fuel pressure regulator may be equipped with an outlet oriented in any of six directions with respect to said inlet.

10. A fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one of two opposite sides of said base having an inlet opening to said regulated fuel pressure chamber to supply fuel thereto, said regulated fuel pressure chamber opening through a third side of said base adjacent said one side, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, wherein one of the remaining three sides of said base adjacent said one side has a projection and, with another of said remaining sides, defines three planar regions and the other of said opposite sides defines a fourth planar region, said four planar regions being oriented in four different directions with respect to said inlet, and wherein an outlet is formed through one of said planar regions, said outlet opening from said excess fuel chamber to discharge fuel therefrom.

11. A fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one of two opposite sides of said base having an inlet opening to said regulated fuel pressure chamber to supply fuel thereto, said regulated fuel pressure chamber opening through a third side of said base, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, and wherein two of the remaining three sides of said base and the other of said opposite sides define four planar regions, three of said planar regions being formed by said two remaining sides and said other of said opposite sides, and one of said two remaining sides of said base having a projection forming the fourth of said planar regions, said four planar regions being oriented in four different directions with respect to said inlet, each of said planar regions being adapted to accept a cutting tool for forming an outlet, and wherein an outlet is formed through one of said planar regions, said outlet opening from said excess fuel chamber to discharge fuel therefrom.

12. An assembly of a fuel pressure regulator and a fuel body, said fuel pressure regulator comprising a base formed from an extrusion and having a regulated fuel pressure chamber and an excess fuel chamber, a valve seat separating said regulated fuel pressure chamber from said excess fuel chamber, said base being substantially six-sided and one side of said base having an inlet opening to said regulated fuel pressure chamber to supply fuel thereto, said regulated fuel pressure chamber opening through a second side of said base, a diaphragm supported on said base and closing said regulated fuel pressure chamber, said diaphragm carrying a valve member for controlling fuel flow through said valve seat to maintain a desired fuel pressure in said regulated fuel pressure chamber and to discharge excess fuel from said regulated fuel pressure chamber through said valve seat to said excess fuel chamber, wherein the remaining four sides of said base define a plurality of planar regions and include at least one projection forming at least one of said planar regions, said planar regions being oriented in different directions with respect to said inlet, each of said planar regions being adapted to accept a cutting tool for forming an outlet, wherein an outlet is formed through one of said planar regions, said outlet opening from said excess fuel chamber to discharge fuel therefrom, wherein said fuel body has a snout projecting therefrom and a fuel passage extending through said snout, and wherein said fuel pressure regulator inlet is plugged directly onto said snout whereby said fuel passage supplies fuel to said regulated fuel pressure chamber and said fuel pressure regulator maintains the desired fuel pressure in said fuel passage.

* * * * *